United States Patent [19]

Kauss

[11] Patent Number: 4,679,633
[45] Date of Patent: Jul. 14, 1987

[54] METHOD FOR DEPTH ADJUSTMENT OF A TILLING MACHINE

[75] Inventor: Wolfgang Kauss, Lohr-Wombach, Fed. Rep. of Germany

[73] Assignee: Mannesmann Rexroth GmbH, Lohr/Main, Fed. Rep. of Germany

[21] Appl. No.: 650,010

[22] Filed: Sep. 13, 1984

[30] Foreign Application Priority Data

Oct. 13, 1983 [DE] Fed. Rep. of Germany ....... 3337317

[51] Int. Cl.$^4$ .................... A01B 63/112; A01B 79/00
[52] U.S. Cl. ........................................... 172/1; 172/7
[58] Field of Search .................... 172/1, 2, 4, 7, 9, 10, 172/12; 73/862.57, 862.59, 862.67; 333/174; 318/587

[56] References Cited

U.S. PATENT DOCUMENTS

| 2,606,970 | 8/1952 | Scott | 333/174 X |
| 3,327,210 | 6/1967 | Wu | 333/174 X |
| 4,437,048 | 3/1984 | Arnold | 172/7 X |

FOREIGN PATENT DOCUMENTS

| 1557862 | 4/1970 | Fed. Rep. of Germany | 172/7 |
| 2508620 | 8/1975 | Fed. Rep. of Germany | 172/7 |
| 2837605 | 3/1980 | Fed. Rep. of Germany | 172/7 |
| 2927585 | 4/1980 | Fed. Rep. of Germany | . |
| 3106086 | 9/1982 | Fed. Rep. of Germany | . |
| 24280 | 1/1960 | German Democratic Rep. | . |
| 231917 | 3/1969 | U.S.S.R. | 172/2 |
| 934940 | 6/1982 | U.S.S.R. | 172/4 |

Primary Examiner—Richard T. Stouffer
Attorney, Agent, or Firm—Fleit, Jacobson, Cohn & Price

[57] ABSTRACT

A method and apparatus for adjusting the working depth of a soil-moving (soil-working, tilling) machine carried by a tractor includes adjusting the position of the machine in relation to the tractor in dependence upon a traction signal and upon a position signal. The traction signal corresponds to the traction produced on the machine in the soil and the position signal corresponds to the position of the machine in relation to the tractor. A portion of the traction signal above a certain cut-off frequency and a portion of the position signal below the same cut-off frequency or below a lower one are utilized in the adjusting control.

14 Claims, 4 Drawing Figures

METHOD FOR DEPTH ADJUSTMENT OF A TILLING MACHINE

BACKGROUND OF THE INVENTION

The invention relates to a method and an apparatus for the adjustment of the working depth of a soil tilling machine.

The attachment of tilling machines to prime movers, such as tractors and/or other hauling devices, has the advantage that the development of traction by the tractor is improved by the force of weight of the entire mechanism and by other forces produced by the tilling machine as the machine moves through the soil. Also, losses, due to the friction developed by the pulled machines, are absent. When moving soil, e.g., when tilling, it is desirable to obtain a uniform working depth during certain operations and thereby achieve a certain soil condition, distribution of the sediment, or to achieve other desirable results.

In the utilization of such a tilling (soil-moving) machine, it is well known to adjust the traction, produced by the tilling machine in the ground in relation to the tractor, and to efficiently utilize the output of the tractor. The traction is adjusted in accordance with the deformation of a measuring spring caused by the degree of traction. The deformation of the spring represents a control value for the adjustment of the working depth. In this view, the degree of traction is utilized in an opposing sense. In homogeneous soil without any variations in slope, a constant value of traction is obtained if a constant working depth is maintained by the tilling machine. However, when the degree of traction changes due to a change of the soil resistance or a change of the slope of the surface being tilled, the working depth of the machine automatically changes.

To minimize the changes in the working depth of the tilling machine, one prior art device utilizes a "mixed adjustment" control, in which, to adjust the relative position of the device with respect to the tractor, an adjustment signal is produced which is composed of a traction signal and of a position signal. The latter signal corresponds to the relative position of the device in relation to the tractor. Depending upon the pre-set or predetermined ratio established between the traction signal and the position signal in the mixing process, the traction adjustment or the position adjustment signal is predominant in this control device. In other situations, when the soil changes, a change of the working depth corresponds to a loss of insensitivity and a loss of velocity in the response to the control inputs. In East German Pat. No. 24 280, a control device is disclosed for the automatic depth adjustment of tilling devices attached to tractors, which particularly relates to plows. The control device includes a traction control and working depth control which is adjustable in relation to the automatic depth control. The control device has a delaying and a counteracting effect and is dependent upon the position between the tractor and the device. With this combined control, a nominal or desired value of traction is set by way of an adjustment of the position and that value changes when the soil resistance changes by slowly following or tracing the deviation from the nominal or desired position value. This control device includes, along with the automatic control system, an integrated control stage and an integrating governor, hence the device tends toward instability. This instability causes a continually variable working depth.

Additionally, West German Pat. No. 29 27 585 discloses an improvement of the mixing control and relates to a method and a device for the adjustment of the working depth. In that device, the follow-up or deviation from the nominal value of the traction is monitored and that follow-up is limited or cut-off in accordance with corresponding changes in the degree of traction or position. However, an adjustment of this kind cannot be theoretically extended because of the many parameters involved, because of their interrelationship and because of the wide range of working conditions. For that reason, the consequences of setting certain limits or nominal values cannot be accurately predicted and further the establishment of those various values to correspond to field working conditions results in greater cost. Hence, the prior art devices teach away from this type of method and/or device.

SUMMARY OF THE INVENTION

The present invention achieves an even working depth at a nominal cost and with an easily implemented method.

In accordance with the present invention, a mixing adjustment is performed with a traction signal and a position signal by utilizing a high frequency component from the traction signal and a high frequency component or other equal component from the position signal prior to the mixing adjustment. The basic assumption is that, during the adjustment, the main disturbance variables affecting the adjustment are caused by the soil acting on the tilling machine. On one hand, the movements of the tractor are caused by the unevenness of the ground, viz., the pitching vibrations, and, on the other hand, are caused by the changes in the soil resistance acting on the machine. At any given moment, the pitching vibrations of the tractor result in dynamic changes in the working depth and, as a consequence thereof, result in changes in the traction. Hence, traction signals of a certain frequency above a certain cut-off frequency are representative of this phenomenon. Those traction signals are used for the adjustment of the position so that any change in depth can be rapidly eliminated by the controller. The changes in the position resulting therefrom do not generate low frequency position signals so that the control device does not counteract the high frequency traction signal. In contrast thereto, changes due to the resistance of the soil are reflected very slowly in the traction signal, i.e., those changes are practically static. Those low-frequency components of the traction signal are suppressed so that an adjustment of the working depth is not made for the low frequency range. Therefore, the present invention achieves, at low cost, a uniform working depth even when the tractor undergoes considerable movements and when the soil resistance changes considerably, without any need for a critical adjustment or later readjustment.

BRIEF DESCRIPTION OF THE DRAWINGS

The invention will be explained in detail on the basis of examples of different embodiments of the present invention with reference to the drawings, in which.

DETAILED DESCRIPTION OF THE DRAWINGS

Figure 1:
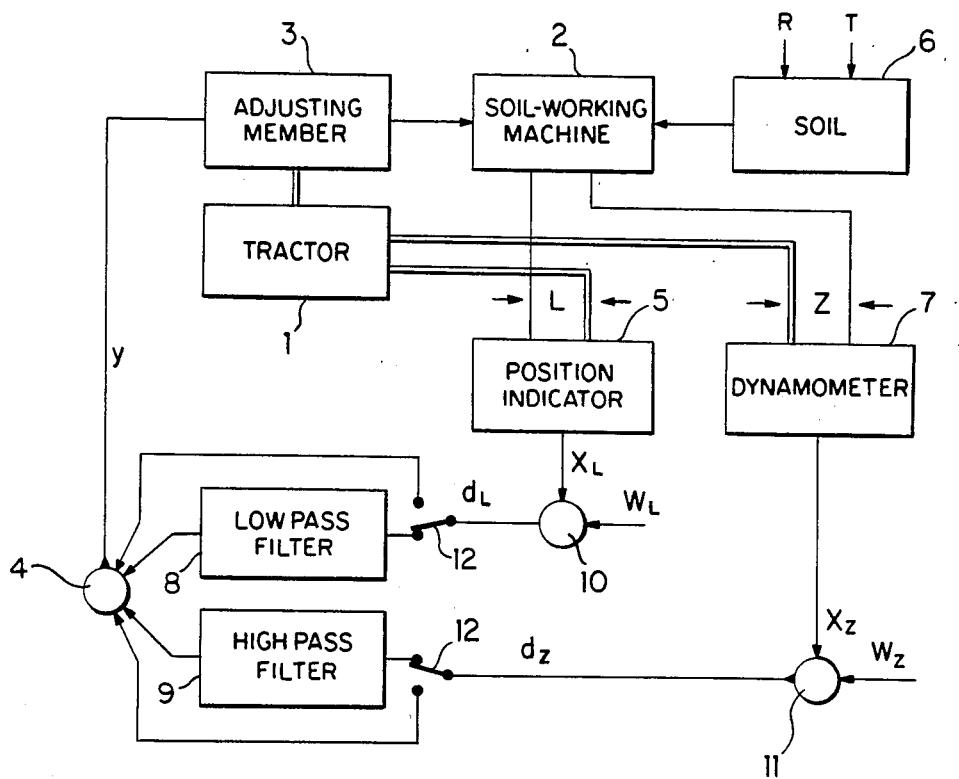
FIG. 1 is a schematic block diagram of the method and of the device for the adjustment of the working depth.

FIG. 1 shows schematically the method and the apparatus for the adjustment of the working depth of a soil-working machine 2 that is carried by a tractor 1. The position of the machine 2 in relation to the tractor 1 may be adjusted with the aid of an adjusting member 3 that is governed by control signals y coming from a mixing member 4, e.g., a power lift with the appropriate control means, or a similar device, represents the adjusting member 3. A relative position L set between the machine 2 and the tractor 1 is detected by means of a position indicator 5 and converted into an actual position signal $x_l$. When the machine 2 has been lowered into the ground 6 and pulled therethrough, the forces acting on machine 2 depend upon the specific soil resistance R, at any given time, and upon the working depth T, at any given moment. Those forces generate, on the machine 2, a traction Z that will have to be supplied by the tractor 1. The tractor Z is detected by means of a dynamometer 7 and converted to an actual traction signal $x_z$. The dynamometer 7 generates a signal, e.g., with a measuring spring and a measurement indicator for the conversion of the deformation of the measuring spring by the traction.

In the present invention, the actual position signal $x_l$ is conveyed to the mixing member 4 by way of a low-pass filter 8, and the actual traction signal $x_z$ is conveyed to the mixing member 4 by way of a high-pass filter 9. The high-pass filter 9 has a certain limiting or predetermined cut-off frequency, while the low-pass filter 8 has the same limiting frequency. Alternatively, the low-pass filter could have a lower limiting frequency. It was found that, due to the pitching movements of the tractor 1 together with the machine 2, the working depth 1 changes such that the traction changes in the frequency range from 1 to 5 Hz and those changes are dependent on properties such as, e.g., the mass of the tractor. Those modifications or changes in traction are conveyed, as actual traction signals, to the mixing member 4 by way of the high-pass filter 9 and bring about, through adjusting signal y, by way of the adjusting member 3, a modification of position generated between the machine 2 and the tractor 1. The modification counteracts the change of the working depth T. Due to changes in traction, the position also changes in the frequency range from 1 to 5 Hz. In order that the changes of position are not eliminated by the control device, a position signal in the frequency range in question is suppressed by the low-pass filter 8.

In contrast thereto, the soil resistance R changes relatively slowly so that modifications of traction caused thereby may be assigned to the frequency range from 0 to 1 Hz. In order that those slow modifications do not lead to changes of position, and thereby to changes of the working depth T, the dynamometer signal is blocked with the aid of the high-pass filter 9. Filter 9 has a predetermined cut-off frequency of 1 Hz in the preferred embodiment. The modifications of traction due to modifications of the soil resistance R do not translate into position changes, so that the working depth T is maintained, despite the modifications of traction. In that situation, the working depth T is determined by the position signal.

To adjust the working depth, a comparator 10 has been provided that combines the actual position signal, from the position indicator 5, with a nominal or desired position signal $w_l$ to generate a differential position signal $d_l$. That control signal $d_l$ is converted into the adjusting signal y by low-pass filter 8 and mixing member 4. In that manner, the working depth T, as represented by the nominal or desired position signal $w_l$, may be input into the control device.

The above apparatus achieves an easily surveyable and controlled action. In accordance with FIG. 1, the actual traction signal $x_z$ is also applied to a traction-comparator 11. In comparator 11, traction signal $x_z$ is combined with a desired traction signal $w_z$ to form a differential traction signal $d_z$. That differential traction signal $d_z$ represents the deviation, at any given moment, of the actual traction from the desired value of traction, as represented by the nominal or desired traction signal $w_z$. As shown in FIG. 1, a switching mechanism 12 is provided between the comparator 10 and the low-pass filter 8 and between the comparator 11 and the high-pass filter 9. With the aid of switching mechanism 12, the differential position signal $d_l$ and/or the differential traction signal $d_z$ may be applied directly to the mixing member 4 thereby bypassing the low-pass filter 8 and/or the high-pass filter 9. The switching mechanism is used during the operation of the machine 2 to test or readjust the settings of the nominal position signal $w_l$ and of the nominal traction signal $w_z$. With the aid of switching device 12, it is possible to bypass the low-pass filter 8 and rapidly lower the machine by means of the nominal position signal $w_l$, to a desired working depth T. On the other hand, it is possible, with the aid of switching device 12 to bypass high-pass filter 9 and adjust the mechanism to a desired ground-traction value that is chosen in accordance with the soil conditions or with the center of gravity of the tractor 1. After the adjustments have been made, the low-pass filter 8 and the high-pass filter 9 are cut in, whereupon the working depth will automatically be adjusted by the device.

Figure 2:
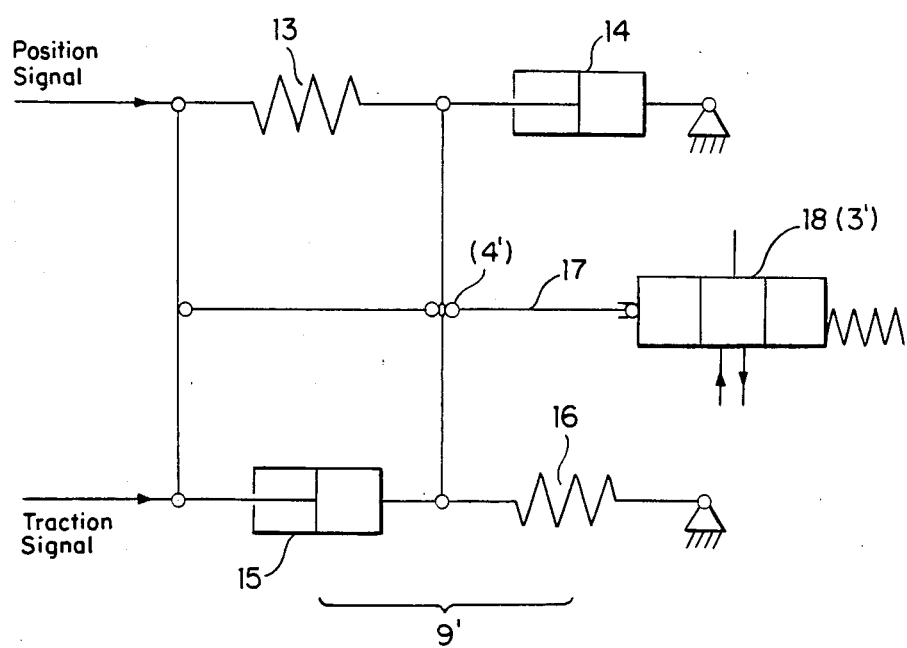
FIG. 2 shows a mechanical version as an embodiment of the adjusting device.

FIG. 2 shows an example of the embodiment of the adjusting device in which the position signal and the traction signal are present in a mechanical form, viz., as moving signals. In this embodiment of the invention, the low-pass filter 8 and the high-pass filter 9 are designed as mechanical filters. To that end, a spring member 13 and a mechanical damping element 14 interact in such a way that high-frequency position signals will be intercepted, while the connecting point of the spring member 13 and of the damping element 14 is made to follow-up a low-frequency position signal. In contrast thereto, in the high-pass filter 9', a connecting point between a damping element 15 and a spring member 16 is made to follow-up a traction signal of high frequency, while a low-frequency traction signal is intercepted. In each case, the output signals of the filters are applied, in the form of movement, to a common fulcrum that has been designated schematically as mixing member 4', and by the movement of which an input member 17 of a slide valve 18. The valve represents a control stage of the adjusting member 3' and is, in this case, servo-hydraulic.

Figure 3:
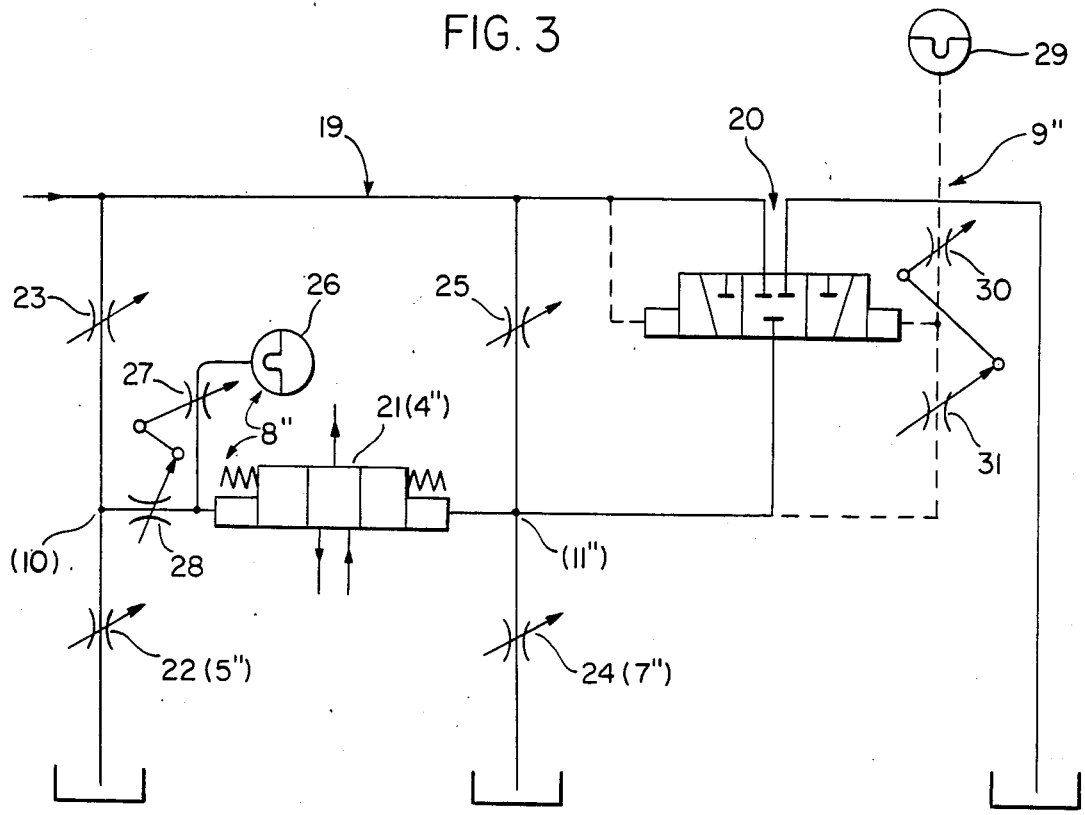
FIG. 3 shows a hydraulic version as another embodiment of the adjusting device.

FIG. 3 shows schematically another embodiment of the adjusting device for use in a servo-hydraulic control system of the type described, e.g., in the West German Pat. No. 31 06 086. In this control system, a pressure-regulating valve 20 and a slide valve 21, that is used as mixing member 4'', generates the adjusting signal for the adjusting member 3'' (not shown), and both are part of a control circuit 19. To that end, a position signal is generated with the aid of the interaction of a position-measuring orifice or diaphragm 22 with a nominal-position value orifice or diaphragm 25. In the control mechanism in this embodiment, the position-signal components are generated by means of the orifices or diaphragms 22 and 23, and those components having a higher frequency are eliminated by a low-pass filter 8''. Filter 8'' consists of a hydraulic store 26 and of an adjustable diaphragm 28. The position signal is a pressure value and the high-frequency portion thereof is intercepted in the hydraulic store 26, while the static part and/or the lower frequency portion thereof is supplied to the slide valve 21, practically without any change. The adjustable diaphragm 28 and diaphragm 27 may be moved in opposition to one another, in order to eliminate the filtering effect of the low-pass filter 8''. The traction signal is a pressure value formed by the diaphragms 25 and 26, and low-frequency components thereof are suppressed by means of a high-pass filter 9'''. Filter 9'' consists of the pressure-regulating valve 20, of a hydraulic store 29, and an adjustable orifice or diaphragm 31. Due to high-pass filter 9''', high-frequency pressure changes pass adjustable orifice or diaphragm 31, and are applied to the slide valve 21, without any change. The filtering action of the high-pass filter 9'' may be eliminated by adjustable orifice or diaphragm 31 and by an adjustable orifice or diaphragm 30 such that the signals may be moved in the opposite sense.

Figure 4:
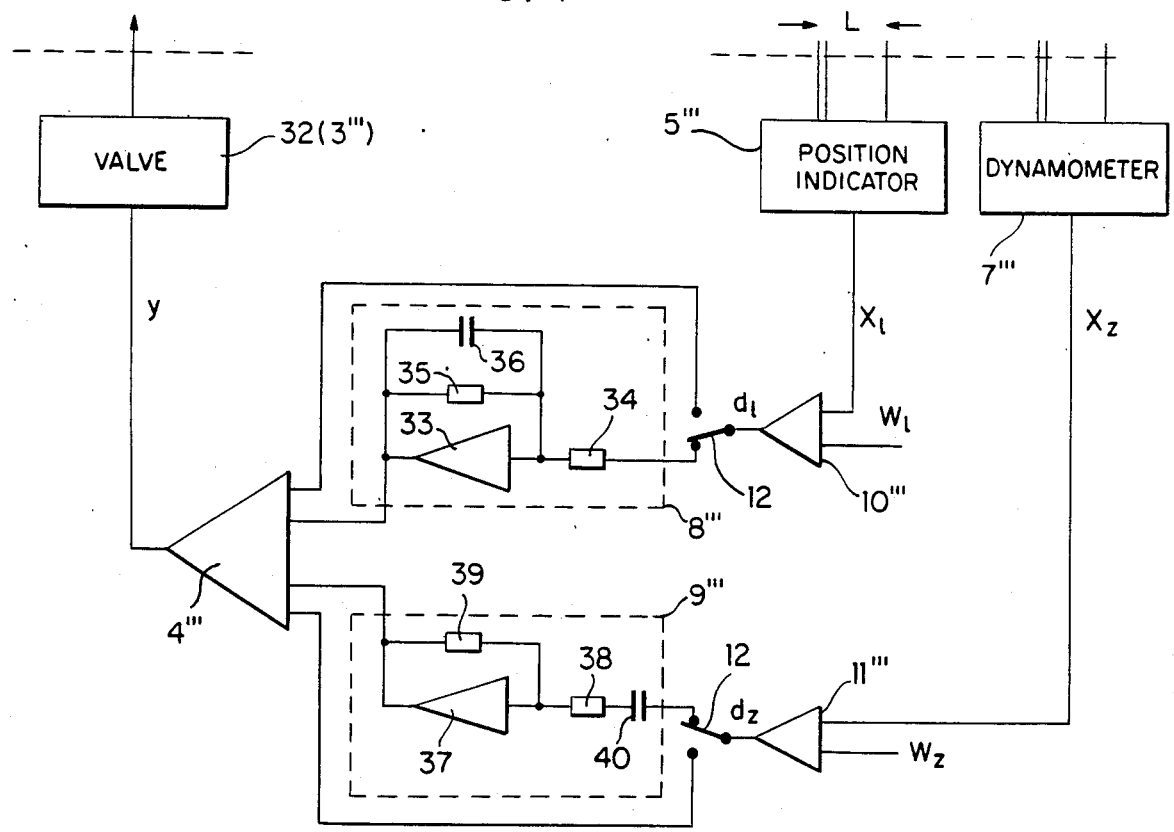
FIG. 4 shows an electrical version as a further embodiment of the adjusting device.

FIG. 4 shows another embodiment of the adjusting device in which the position indicator 5'''' and the dynamometer 7'''' are mechanical-electrical transformers that transform mechanical displacements and/or forces into electrical signals. In consequence thereof, the position indicator 5'''' provides an actual-position signal $x_I$, while the dynamometer 7'''' provides an actual-traction signal $x_z$. The signals are transformed electrically by the mixing member 4'''' into an electric adjustment signal 6'''', by which a valve 32 is actuated. That valve represents the input stage of a hydraulic adjusting member 3''''. In this embodiment of the invention, the actual position signal $x_I$ and a desired nominal position signal $w_I$ are combined in a comparator 10 to form a differential position signal $d_I$ and the resulting signal is conveyed to the mixing member 4'''' by way of low-pass filter 8''''. In this case, the low-pass filter 8'''' is a well known active filter with an operational amplifier 33, with resistors 34 and 35, and with a condenser 36. In comparator 11'''', the actual-traction signal $x_z$ is compared with a desired nominal-traction signal $w_z$ and combined into an electric differential traction signal $d_z$. The resultant signal is applied to the mixing member by way of a high-pass filter 9''''. Filter 9'''' is a well-known active filter with an operational amplifier 37, with resistors 38 and 39, and with a condenser 40. In addition, a switching mechanism 12 in the form of two reversing switches is provided, which is utilized in accordance with the explanations presented hereinabove with respect to FIG. 1, e.g., for testing, adjustment or readjustment. The differential signals $d_z$, $d_I$ may be conveyed directly to the mixing member 4 by the switches which bypass the filters. In FIG. 4, the filters 8'''' and 9'''' have been shown as active filters of the first order, but filters of a higher order may be utilized therein.

In all the embodiments of the invention described above, it is advantageous to provide an adjustable mixing ratio between the position signals and traction signals in the mixing member 4, such that the device is adoptable to various control sensitivities and to many situations that may occur in the field. Also, such a device is capable of compensating for many different soils and dampings of the filters.

In addition, adjustable filters 8 and 9 may be utilized since modifying the limiting frequencies therein adapts the adjusting device for different operations conditions caused by properties of the tractor, by the state of the surface of the ground, and by other similar factors.

What is claimed is:

1. A method for adjusting the working depth of a soil-tilling machine that is carried by a tractor, the position of the soil-tilling machine being adjusted in relation to the tractor, said method comprising
    extracting by a first control loop a high frequency component of a traction signal equal to, at the least, a predetermined cut-off frequency, said traction signal representing the traction as produced on the soil-tilling machine in the soil,
    extracting by a second control loop a low frequency component of a position signal equal to, at the most, said predetermined cut-off frequency, said position signal representing the position of the soil-tilling machine in relation to the tractor,
    mixing said extracted components only of said traction and position signals to generate an adjusting signal for controlling the elevation of the soil-tilling machine with respect to the tractor by keeping said first control loop and said second control loop separate so that the elevation adjustments caused by said traction signal and said position signal, respectively, are mutually independent.

2. A method as claimed in claim 1, wherein said traction high frequency component and said position low frequency component are equal.

3. A method as claimed in claim 1, wherein said position low frequency component is less than said traction high frequency component.

4. A method as claimed in claim 1, wherein said predetermined cut-off frequency equals approximately 1 Hz.

5. A method as claimed in claim 1, wherein, during the mixing process for generating said adjusting signal, the mixing ratio of traction signal and position signal is adjusted.

6. A method as claimed in claim 1, wherein said position signal is composed of an actual position signal and or a desired position signal.

7. A method as claimed in claim 1, wherein said traction signal is composed of an actual traction signal and of a desired traction signal.

8. A method as claimed in claim 1 wherein the amount of traction signal and position signal extracted is adjustable.

9. A method as claimed in claim 1 including the step of controllably avoiding the extraction of components of selectively one of said traction and said position signals prior to mixing.

10. A method as claimed in claim 1 including the step of altering the mixing ratio between the extracted components of said traction and position signals.

11. A method as claimed in claim 1 including the step of mechanically obtaining and extracting components of said traction and position signals.

12. A method as claimed in claim 1 including the step of hydraulically obtaining and extracting components of said traction and position signals.

13. A method as claimed in claim 12 wherein the hydraulic extraction is adjustable.

14. A method as claimed in claim 1 including the step of electrically obtaining and extracting components of said traction and position signals.

* * * * *